March 1, 1927.

D. G. BOND

TRAFFIC SIGNAL

Filed Jan. 25, 1926

Inventor
D. G. Bond.

By Lacy & Lacy, Attorneys

March 1, 1927.  
D. G. BOND  
TRAFFIC SIGNAL  
Filed Jan. 25, 1926  
1,619,562  
2 Sheets-Sheet 2
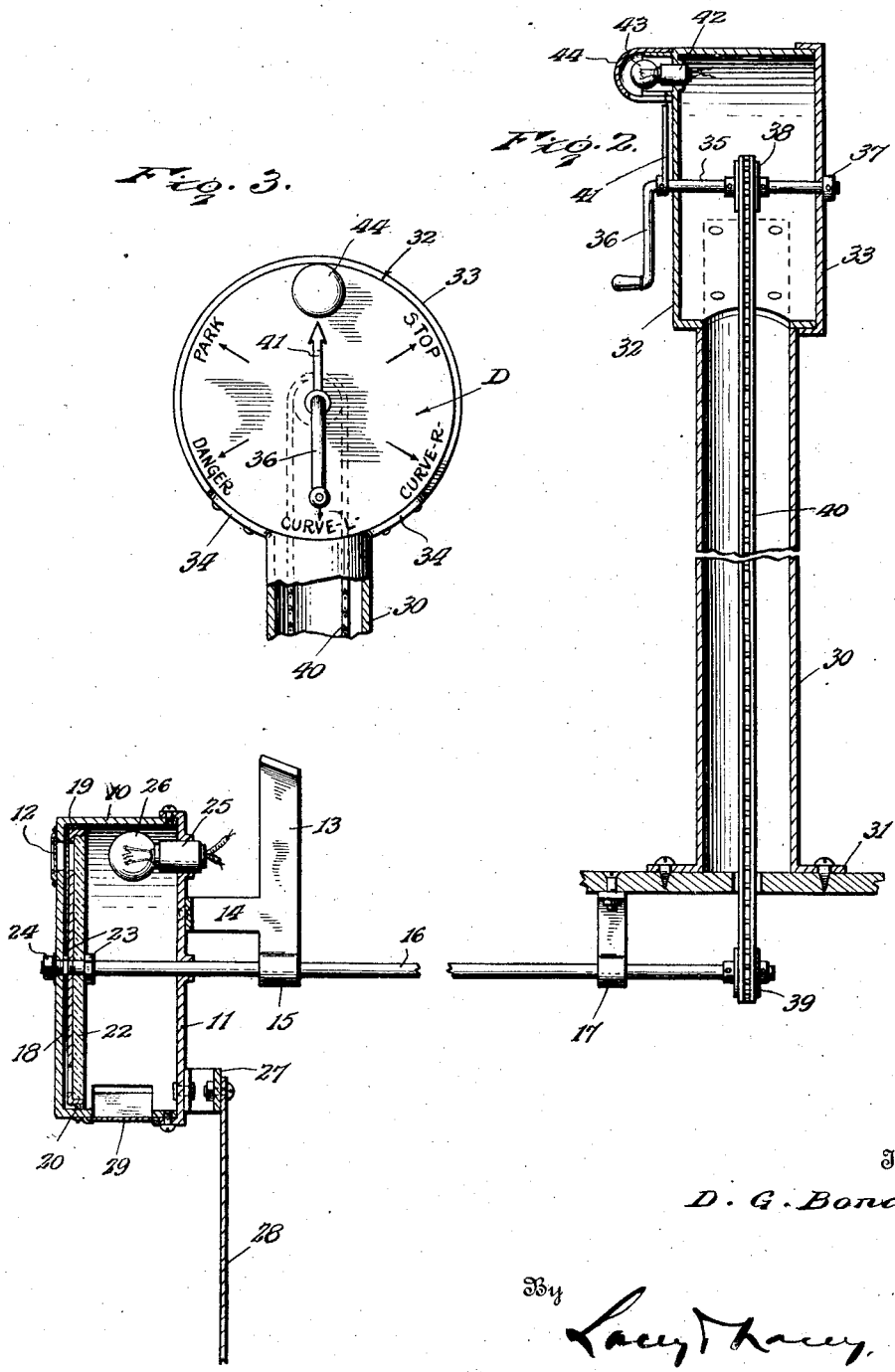
Inventor  
D. G. Bond.  
By Lacey & Lacey, Attorneys Patented Mar. 1, 1927.

1,619,562

UNITED STATES PATENT OFFICE.

DAVID G. BOND, OF QUITSNA, NORTH CAROLINA.

TRAFFIC SIGNAL.

Application filed January 25, 1926. Serial No. 83,649.

This invention relates to an improved traffic signal for motor vehicles and seeks, among other objects, to provide a device whereby a driver may readily signal an intention to slow down or stop, to turn to the right or to the left, or to park.

A further object of the invention is to provide a device which may be readily manipulated by the driver and wherein a dial will be provided for indicating to the driver the particular signal displayed.

And the invention seeks, as a still further object, to provide a device well adapted for general use upon motor vehicles now in service as well as to provide a device which may be readily installed and which will be of such simple and sturdy construction as will minimize the possibility of premature failure.

Other objects of the invention not specifically mentioned in the foregoing will appear during the course of the following description.

In the accompanying drawings:

Figure 2 is a vertical sectional view more particularly showing the structural details of the device.

Figure 3 is a fragmentary elevation showing the dial of the control post of the device.

Figure 1:
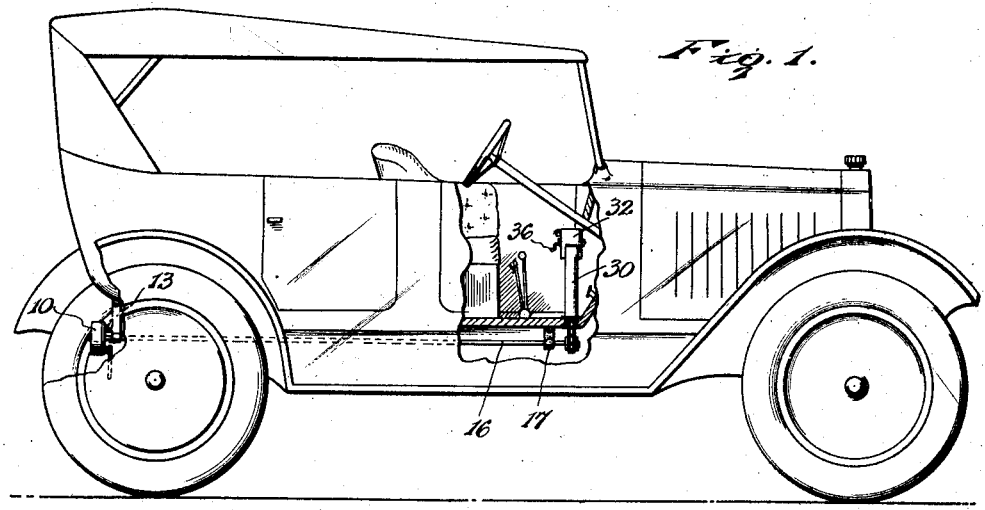
Figure 1 is a side elevation showing my improved signal installed upon a conventional motor vehicle.
Figure 4:
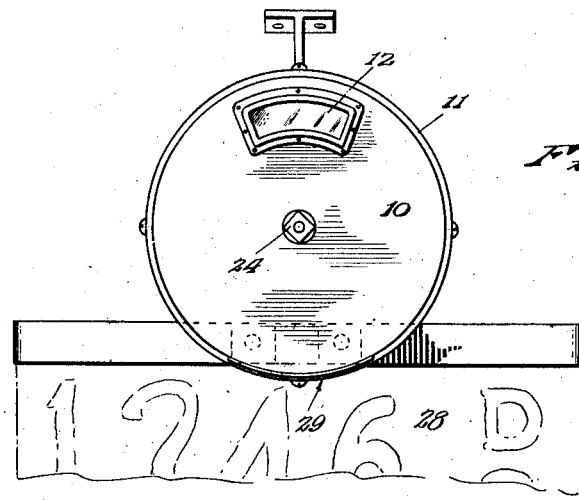
Figure 4 is a detail rear elevation of the signal casing.

In carrying the invention into effect, I employ a preferably cylindrical casing 10 which may be formed of suitable sheet metal, and normally closing the casing at the back thereof is a cap 11 while the front wall of the casing is provided with a segmental window 12 of mica, celluloid or other approved transparent material. In Figure 1, I have shown my improved signal in connection with a conventional motor vehicle. As will be observed, the casing 10 is conveniently disposed at the rear of the vehicle, and rigidly supporting the casing upon the vehicle is a bracket 13 having an arm 14 which is appropriately fixed to the cap 11 while, as brought out in Figure 2, said bracket is further provided below the arm 14 with a bearing sleeve 15.

Figure 5:
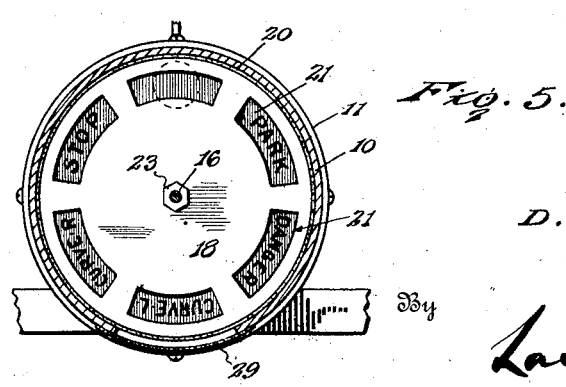
Figure 5 is a vertical sectional view through the casing more particularly showing the legends of the signaling member employed.

Journaled through the sleeve 15 of the bracket 13 is a horizontally disposed shaft 16 which, as brought out in Figure 1, extends forwardly beneath the vehicle, and journaling said shaft near its forward end is a bracket 17 depending from the floor of the vehicle. The rear end portion of the shaft is journaled through the cap 11 of the casing 10 as well as through the front wall of said casing and fixed to said shaft within the casing is the signaling member employed. As brought out in Figures 2 and 5 of the drawings this member includes a preferably metallic disc 18 having a peripheral rearwardly turned flange 19, and adhesively or otherwise appropriately fixed to said flange is a surrounding packing strip 20 of felt or the like cooperating with the cylindrical wall of the casing for preventing the passage of light between the periphery of the disc and the casing. Formed in said disc, as seen in Figure 5, is a series of spaced segmental openings 21, and snugly fitting within the flange 19 to lie flat against the rear side of the disc is a circular transparency 22 overlying said openings. The transparency is preferably formed of red colored glass and painted or otherwise imposed thereon at the several openings 21 of the disc, except one, are the legends: Park, Danger, Curve L, Curve R, and Stop. At the remaining opening of the disc the transparency is blank. Screwed on the shaft 16 are nuts 23 clamping the disc 18 and transparency 22 therebetween, and screwed on the rear end of the shaft externally of the casing is a nut 24 disposed to cooperate with the rear wall of the casing for restraining the shaft against forward endwise movement.

Fixed to the cap 11 to project into the casing 10 is an appropriate lamp socket 25 in which is removably mounted a lamp 26 disposed opposite the window 12 of the casing and, as will now be seen, the openings 21 in the disc 18 are so located that the signaling member may be rotated for selectively disposing said openings in registration with the window and separately displaying the signal legends. Fixed to the cap 11 is a bracket 27 disposed to support a license plate, as conventionally illustrated at 28, at the rear of the vehicle, and arranged at the bottom of the casing 10 is a window 29 for liberating some of the light from the casing so that the license plate will be illuminated.

Upstanding from the floor of the vehicle forwardly of the driver's seat is a control post 30 provided at the bottom thereof with a flange 31 screwed or otherwise secured to the vehicle floor, and fixed to the upper end of said post is a housing 32 normally closed by a cap 33. As brought out in Figure 3, the post 30 is provided at the upper end thereof with ears 34 which are riveted or otherwise secured to the housing for rigidly connecting the housing to the post, and journaled through the housing axially thereof is a control shaft 35 carrying a hand crank 36. Removably fixed upon the forward end of the shaft is a collar 37 restraining the shaft against rearward displacement, and mounted upon the shaft within the housing is a sprocket 38. Fixed upon the forward end of the shaft 16 is a similar sprocket 39 and trained about said sprockets is a sprocket chain 40 which is freely accommodated through the post 30 and through a suitable opening in the floor of the vehicle. Thus, as will be seen, the crank 36 may be manually turned for rotating the shaft 16 and turning the signaling member. Fixed to the rear end portion of the shaft 35 is a pointer 41 and, as shown in Figure 3, the rear end wall of the housing 32 is provided with legends identical with the legends on the transparency 22 so as to form an indicating dial D behind the pointer. Extending through the rear end wall of the casing near the upper side of said casing is an appropriate lamp socket 42 in which is removably fixed a lamp 43 for illuminating the dial, and extending over the lamp is a suitable hood 44 for reflecting the light downwardly.

As will now be appreciated, the crank 36 may be grasped by the driver and the shaft 35 turned until the pointer 41 is disposed opposite the word Stop on the dial D, when the signal legend Stop of the signaling member will be brought opposite the window 12 of the casing 10 for signaling an intention of the driver to stop. Similarly, the crank 36 may be turned to dispose any one of the other signal legends of the signaling member opposite the window for signaling the intention of the driver to slow down, when the word Danger will be displayed, for signaling the intention of the driver to turn to the right, when the legend Curve R will be displayed, for signaling an intention to turn to the the left, when the legend Curve L will be displayed, or for signaling an intention to park, when the legend Park will be displayed. Ordinarily, the pointer 41 of the shaft 35 will be disposed to point upwardly toward the lamp 43, as shown in Figures 2 and 3 of the drawings, when, as illustrated in Figure 5, the blank opening of the signaling member will be disposed opposite the window 12 for displaying a red tail light at the rear of the vehicle. I thus provide a particularly convenient and efficient device for the purpose set forth and, as will now be perceived, a device well adapted for general use.

Having thus described the invention, what I claim is:

1. A traffic signal including a casing having a window, a shaft journaled through a wall of the casing, a signaling member carried by said shaft within the casing and provided with a signaling device, means for rotating the shaft and turning said member to dispose said device opposite the window for display, means within the casing in the rear of said member for illuminating said signaling device when displayed, and an opaque member closing the space between the signaling member and the wall of the casing for cutting off the passage of light between said signaling member and the casing.

2. A traffic signal including a casing having a single window in one end and having its opposite end entirely closed, a shaft extending axially through the casing, an opaque disc secured on the shaft within the casing and provided with a peripheral flange and having a plurality of circumferentiallly spaced openings adjacent the flange, a transparency fitting within said flange and against the disc and bearing signal legends registering with the respective openings in the disc, and means for rotating the disc to selectively dispose said legends opposite the window in the casing for display.

In testimony whereof I affix my signature.

DAVID G. BOND. [L. S.]